United States Patent
DiFoggio

(10) Patent No.: US 8,656,770 B2
(45) Date of Patent: Feb. 25, 2014

(54) ELECTROMAGNETICALLY HEATED THERMAL FLOWMETER FOR WELLBORE FLUIDS

(75) Inventor: Rocco DiFoggio, Houston, TX (US)

(73) Assignee: Baker Hughes Incorporated, Houston, TX (US)

(*) Notice: Subject to any disclaimer, the term of this patent is extended or adjusted under 35 U.S.C. 154(b) by 407 days.

(21) Appl. No.: 13/173,173

(22) Filed: Jun. 30, 2011

(65) Prior Publication Data

US 2013/0000398 A1    Jan. 3, 2013

(51) Int. Cl.
*E21B 47/10*     (2012.01)
*G01N 25/00*    (2006.01)

(52) U.S. Cl.
USPC ........................... 73/152.29; 73/61.46

(58) Field of Classification Search
USPC ................ 73/61.43, 61.44, 61.46, 152.29
See application file for complete search history.

(56) References Cited

U.S. PATENT DOCUMENTS

| | | | | |
|---|---|---|---|---|
| 3,304,766 A | * | 2/1967 | Hubby | 73/61.44 |
| 4,059,987 A | * | 11/1977 | Dowling et al. | 73/61.43 |
| 4,190,768 A | * | 2/1980 | Arnold et al. | 376/159 |
| 4,228,815 A | * | 10/1980 | Juffa et al. | 137/10 |
| 4,458,709 A | * | 7/1984 | Springer | 137/10 |
| 4,644,263 A | * | 2/1987 | Johnson | 324/605 |
| 4,813,270 A | * | 3/1989 | Baillie | 73/861.04 |
| 4,891,969 A | * | 1/1990 | Wayland et al. | 73/61.44 |
| 5,386,718 A | * | 2/1995 | Proffitt et al. | 73/61.44 |
| 5,388,455 A | * | 2/1995 | Hamby et al. | 73/152.29 |
| 5,461,909 A |   | 10/1995 | Arnold | |
| 6,386,050 B1 | * | 5/2002 | Yin et al. | 73/861.95 |
| 6,874,361 B1 |   | 4/2005 | Meltz et al. | |
| 7,036,356 B2 | * | 5/2006 | Leppanen et al. | 73/61.43 |
| 2008/0066534 A1 |   | 3/2008 | Reid et al. | |
| 2013/0041234 A1 | * | 2/2013 | Grinstein et al. | 600/301 |

FOREIGN PATENT DOCUMENTS

WO    2004079161 A1    9/2004

OTHER PUBLICATIONS

R.W. Parsons, "Microwave Attenuation—A New Tool for Monitoring Saturations in Laboratory Flood Experiments," Society of Petroleum Engineers Journal 1975.
T. Tjomsland, "Comparison of Infrared and Impedance Spectra of Petroleum Fractions," Elsevier Science Ltd., Fuel vol. 75, No. 3, pp. 322-332, 1996.
International Search Report and Written Opinion (PCT/US2012/043065), dated Feb. 26, 2013.

* cited by examiner

*Primary Examiner* — John Fitzgerald
(74) *Attorney, Agent, or Firm* — Bracewell & Giuliani, LLP

(57) ABSTRACT

A method of measuring multiphase flow of components in a wellbore fluid mixture by selectively heating components (e.g. oil and water) in the flow with electromagnetic energy, and detecting the heated components at a known distance downstream. The flow and velocity of components in the flow stream can be estimated with the present method. Example types of electromagnetic waves include infrared, microwaves, and radio waves. The different components can be heated simultaneously or at different times. The heated components can be detected with one or more temperature probes, and oil wet or water wet probes can be used to improve thermal contact to the corresponding components in the fluid stream.

20 Claims, 4 Drawing Sheets

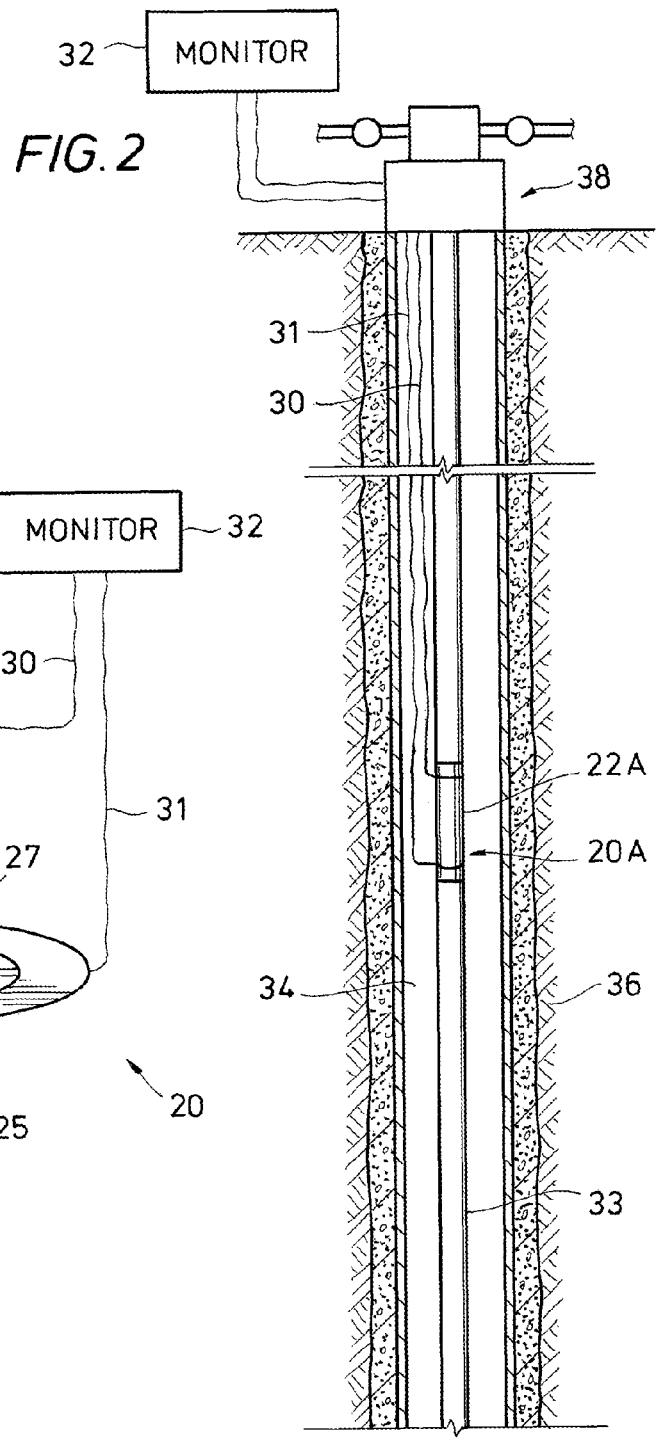

ELECTROMAGNETICALLY HEATED THERMAL FLOWMETER FOR WELLBORE FLUIDS

BACKGROUND

1. Field of Invention

The invention relates generally to a flowmeter for measuring multiphase flow of wellbore fluids in a tubular. More specifically, the present invention relates to a flowmeter that heats a particular constituent in the flow stream electromagnetically and then measures the time delay until a temperature response is detected at some known distance downstream of the heating so as to estimate a flow velocity of that constituent.

2. Description of Prior Art

Flowmeters are often used for measuring flow of fluid produced from hydrocarbon producing wellbores. Flowmeters may be deployed downhole within a producing wellbore, a jumper or caisson used in conjunction with a subsea wellbore, or a production transmission line used in distributing the produced fluids. Monitoring fluid produced from a wellbore is useful in wellbore evaluation and to project production life of a well. In some instances transmission lines may include fluid produced from wells having different owners. Therefore proper accounting requires a flow measuring device that monitors the flow contribution from each owner.

The produced fluid may include water and/or gas mixed with liquid hydrocarbon. Knowing the water fraction is desirable to ensure adequate means are available for separating the water from the produced fluid. Additionally, the amount and presence of gas is another indicator of wellbore performance, and vapor mass flow impacts transmission requirements. Flowmeters can be employed that provide information regarding total flow, water cut amount, and gas fractions. However, these often require periodic analysis of the fluid entering the flowmeter. This may involve deploying a sample probe upstream of the flowmeter; which can produce inaccuracy, and may interrupt or temporarily halt fluid production.

SUMMARY OF THE INVENTION

The present disclosure includes a method and apparatus for measuring a flow of wellbore fluid by heating a fluid constituent with a wave of electromagnetic energy, and then detecting when the heated fluid reaches a location downstream at a known distance from where the fluid was heated. In an example embodiment, a method of measuring flow of a component of a wellbore fluid stream is disclosed that includes heating the component with an electromagnetic wave of a wavelength that the component absorbs. The temperature of the fluid stream downstream of where the fluid stream is being irradiated is monitored to detect when the temperature of the fluid stream increases due to heating with the electromagnetic wave. The velocity of the component is estimated based on the distance between where the fluid stream is being irradiated and where the temperature is being measured, and the time between when the fluid is heated and when the fluid stream temperature increases. In an example, the component is a first component and the fluid stream includes a second component, the second component is heated by irradiating the fluid stream with an electromagnetic wave having a wavelength that is absorbed by the second component. The velocity of the second component is estimated in a same way as for the first component. In an example embodiment, the first component can be a hydrocarbon. In an alternative, the wavelength of the electromagnetic wave can be about 1740 nanometers, which is a near infrared absorption peak for oil. Optionally, the frequency of the electromagnetic wave can have a value of about 15 MHz or about 5 MHz, which are microwave regions where crude oils preferentially absorb. In an example embodiment, the first component comprises water. In an alternative, the wavelength of the electromagnetic wave is about 1450 nanometers, which is a near infrared absorption peak for water. Optionally, the wavelength of the electromagnetic wave is about 1930 nanometers, which is another near infrared absorption peak for water. In an example, the frequency of the electromagnetic wave is about 18 GHz, which is a microwave region at which water preferentially absorbs. Other electromagnetic wavelengths at which the absorption of water and oil are very different may also be used.

Also disclosed herein is a method of measuring a flow of a wellbore fluid that in an example embodiment includes heating oil in the flow of wellbore fluid by directing infrared radiation into the flow, detecting a temperature change in the fluid downstream of where the infrared radiation is directed into the flow that is caused by the infrared radiation heating the oil, estimating a velocity of the oil in the flow that is based on a time difference between when the oil is heated by the infrared radiation and when the temperature change in the fluid is sensed that is caused by the infrared radiation heating the oil. The method further includes heating water in the flow of wellbore fluid by directing infrared radiation into the flow, detecting a temperature change in the fluid downstream of where the infrared radiation is directed into the flow that is caused by the infrared radiation heating the water, and estimating a velocity of the water in the flow that is based on a time difference between when the water is heated by the infrared radiation and when the temperature change in the fluid is sensed that is caused by the infrared radiation heating the water. In an example embodiment of the method, the infrared radiation for heating the oil has a wavelength of around 1740 nanometers. In an example embodiment of the method, the infrared radiation for heating the water, the wavelength is about 1450 nanometers or about 1930 nanometers.

In another example method, flow of one or more fluid components flowing in a stream of a wellbore fluid is evaluated. In an example embodiment of this method the stream of wellbore fluid is irradiated by a microwave with a frequency that is absorbed by the fluid component thereby heating the fluid component, a temperature of the stream of wellbore fluid is monitored at a location downstream of where the microwave is directed into the stream, a change in temperature of the stream of wellbore fluid is detected downstream of where the microwave is directed into the stream that is caused by directing the microwave into the stream of wellbore fluid. A velocity of the component is estimated based on a time difference between when the microwave is directed into the stream and when the change in temperature is detected, and a distance difference between where the microwave is directed into the stream and where the change in temperature is detected. Optionally, the component is oil. In an example when the component is oil, the frequency of the microwave can be about 5 MHz or about 15 MHz. In an alternate embodiment the component is water. In an example when the component is water the frequency of the microwave is about 18 GHz. In an example embodiment, the fluid includes oil and water components, and microwaves are directed into the fluid to heat both water and oil, and oil wet temperature probe and a water wet temperature probes, which should have better thermal contact with their corresponding components, are disposed downstream for monitoring temperature changes. Thus the oil and water components can be heated at substantially the same time and the heating of the oil and water components can be detected at substantially the same time.

BRIEF DESCRIPTION OF DRAWINGS

Some of the features and benefits of the present invention having been stated, others will become apparent as the description proceeds when taken in conjunction with the accompanying drawings, in which:

FIG. 1 is a side perspective view of an example embodiment of a flowmeter coupled with a tubular in accordance with the present invention.

FIG. 2 is a side partial sectional view of an embodiment of the flowmeter of FIG. 1 disposed in production tubing.

Figure 3:
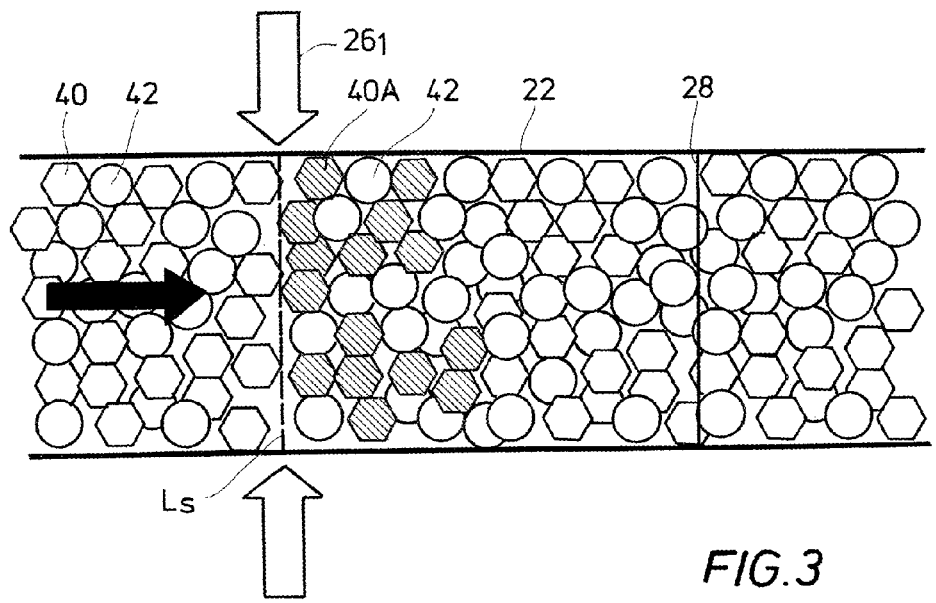
FIGS. 3-6 are side sectional views of embodiments of the flowmeter of FIG. 1 at operational sequences.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation. Accordingly, the improvements herein described are therefore to be limited only by the scope of the appended claims.

An example embodiment of a flowmeter assembly 20 is shown in a side perspective view in FIG. 1. The flowmeter assembly 20 of FIG. 1 is coupled with a tubular 22 in which a flow of fluid travels axially through the tubular 22. Included with the flowmeter assembly 20 is an electromagnetic source 24 that in the schematic example of FIG. 1 circumscribes the outer periphery of the tubular 22. However, other examples exist wherein the electromagnetic source 24 projects along only a portion of the tubular 22 outer circumference. Further illustrated in the example embodiment of FIG. 1 is an aperture 25 provided through the wall of the tubular 22, and in a segment of the region where the tubular 22 is circumscribed by the electromagnetic source 24. An electromagnetic wave 26 is illustrated being directed into the fluid flow in the tubular 22 from the electromagnetic source 24. In an example embodiment, an optional window 27 may be set in the aperture 25, wherein the window 27 is designed to allow passage of electromagnetic waves that are within a designated range, such as the near infrared range or microwave range. The flowmeter assembly 20 of FIG. 1 also includes a temperature probe 28 depicted set within the tubular 22. In the embodiment of FIG. 1, the temperature probe 28 is at a location downstream of where the electromagnetic source 24 is located and at a distance X from the point where the electromagnetic waves 26 enter the tubular 22. Lines 30, 31 are connected respectively to the probe 28 and electromagnetic source 24 on one end and that connect to a monitor 32 on the other end. The monitor 32 may be at a location remote from the electromagnetic source 24.

FIG. 2 is a side partial sectional view of an alternate embodiment of the flowmeter assembly 20A wherein the tubular 22A is a modular section coaxially set in production tubing 33. The production tubing 33 is disposed within a wellbore 34 and is for flowing fluid extracted from a formation 36 up the wellbore 34 and to a wellhead assembly 38 set on an upper end of the wellbore 34. The tubular 22A of FIG. 2 can be formed from material that can be penetrated by an electromagnetic wave 26 of the chosen wavelengths. Examples of material for the tubular 22A of FIG. 2 include pure near-infrared-transparent materials such as perfluorocyclobutyl copolymers for near infrared or microwaves. For microwaves, material for the tubular 22A can be composites, either molded or wound, of epoxy, Kevlar®, glass, aramid, a polymer matrix, an epoxy resin, and combinations thereof. Also in the example of FIG. 2, the monitor 32 is set on surface above the opening of the wellbore 34 so that flow through the flowmeter assembly 20 can be remotely measured and recorded.

FIG. 3 illustrates a side sectional view of an example of operation of the flowmeter assembly 20. In the example of FIG. 3, fluid flow within the tubular 22 includes a first fluid 40 and second fluid 42. In an example embodiment, the first fluid 40 can be a hydrocarbon extracted from a subterranean formation, such as oil, and the second fluid 42 comprises water produced along with the hydrocarbon. As provided in FIG. 1, and represented by the dashed line traversing the tubular 22 of FIG. 3, a source line $L_S$ illustrates the location in the tubular 22 where electromagnetic waves $26_1$ are directed into the tubular 22. In the example of FIG. 3, the electromagnetic waves $26_1$ are designed to be absorbed by the first fluid 40 and thereby heat the fluid downstream of line $L_S$. To illustrate the heated effect, first fluid 40A is shown in a shaded view and downstream of line $L_S$. The electromagnetic waves $26_1$ are chosen because their wavelength is absorbed by a particular fluid to heat that fluid, which in the example of FIG. 3 is the first fluid 40. As such, the second fluid 42, does not absorb the particular electromagnetic waves $26_1$, is not heated by the electromagnetic waves $26_1$, and thereby stays at substantially the same temperature downstream of line $L_S$ as it was upstream of line $L_S$.

Figure 4:
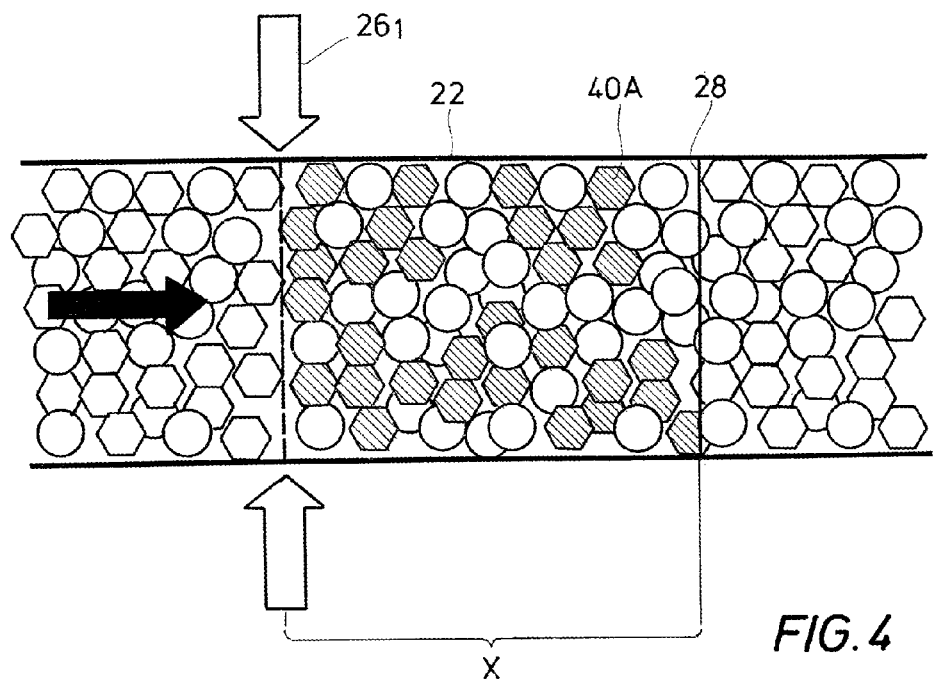

Referring now to FIG. 4, the heated first fluid 40A flows downstream of line $L_S$ and proximate to the probe 28. The temperature of the stream downstream of line $L_S$ changes in response to the heated first fluid 40A, the stream temperature change can be detected by monitoring stream temperature with the probe 28. Thus, in one example, the time between when the electromagnetic waves $26_1$ are directed into the flowstream along line $L_S$ and when the temperature difference in the fluid stream is detected by the temperature probe 28 is measured. The velocity of the heated first fluid 40A can be estimated by dividing the measured time by the known distance X, which is the distance traveled by the heated first fluid 40A after being heated and then being detected.

Figure 5:
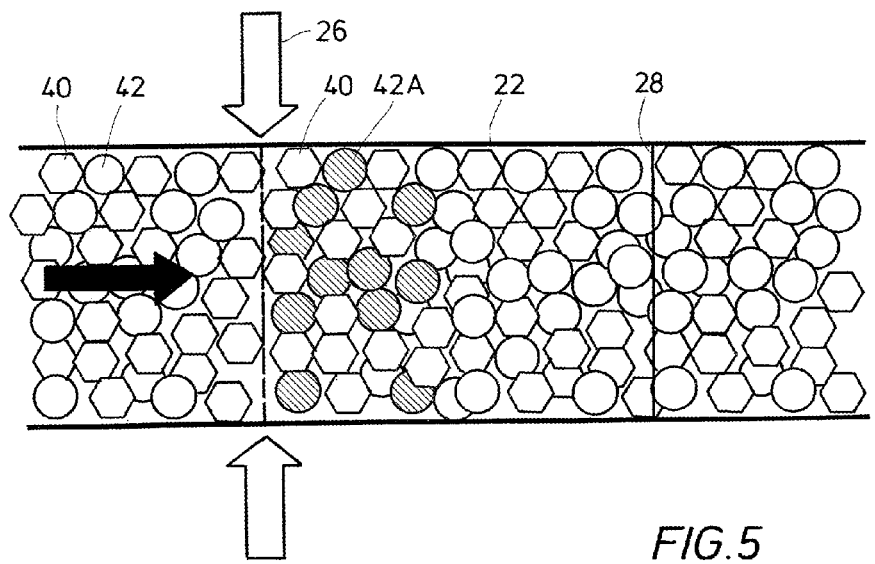

Similarly, as shown in FIG. 5, velocity of the second fluid 42 can be estimated by directing an electromagnetic wave $26_2$ into the fluid flow to form a heated second fluid 42A, then calculating the velocity of the second fluid by dividing the traveled time by the traveled distance as is described above in relation to FIG. 4. The amplitude of the temperature response can be correlated to the volume fraction of that constituent in the flow stream. The flow quantity of that constituent can be estimated as the product of the flow velocity, cross-sectional area of the tubular, and volume fraction of that constituent. The flow quantity can be in terms of a volumetric flow rate or a mass flow rate.

Figure 6:
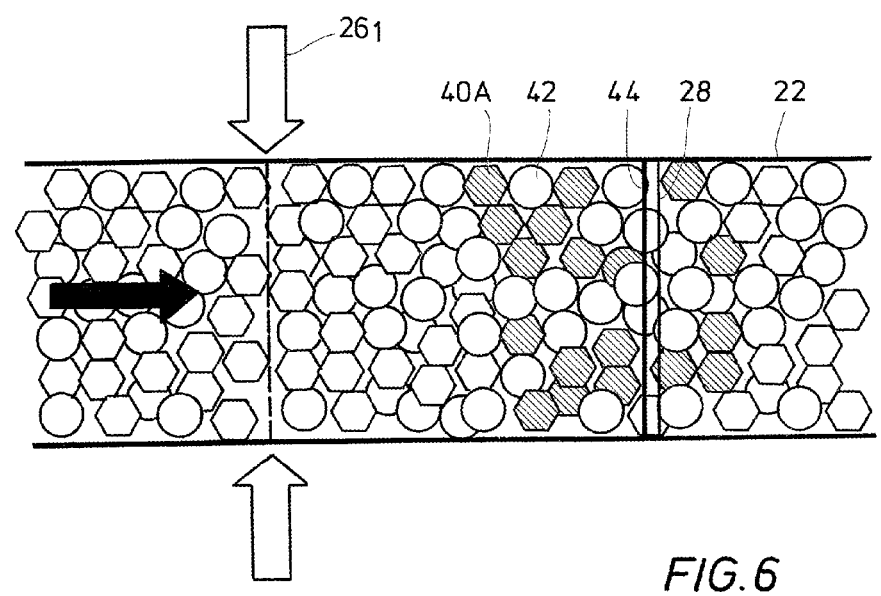

In an alternate example provided in FIG. 6, a pulse of electromagnetic waves $26_1$ heats a plug of heated first fluid 40A in the flow shown flowing within the tubular 22 and across the probe 28. A series of pulses of electromagnetic waves $26_1$, accompanied by continuously monitoring the temperature difference in the temperature probe 28, can provide a continuous real-time measurement of flow within the tubular 22. To avoid aliasing, the pulses can be separated in time by more than the fluid travel time between heating and detection. Optionally, a second probe 44 may be included within the tubular 22, wherein one of the probes 28, 44 is coated with an oil wet or water wet substance so that either only water or oil is sensed by the particular probe. In an example embodiment having both the oil wet and water wet probes, electromagnetic waves may be directed into the tubular for heating both water and oil simultaneously that may then be detected by the corresponding water or oil wet probe downstream in the fluid flow.

Figure 7:
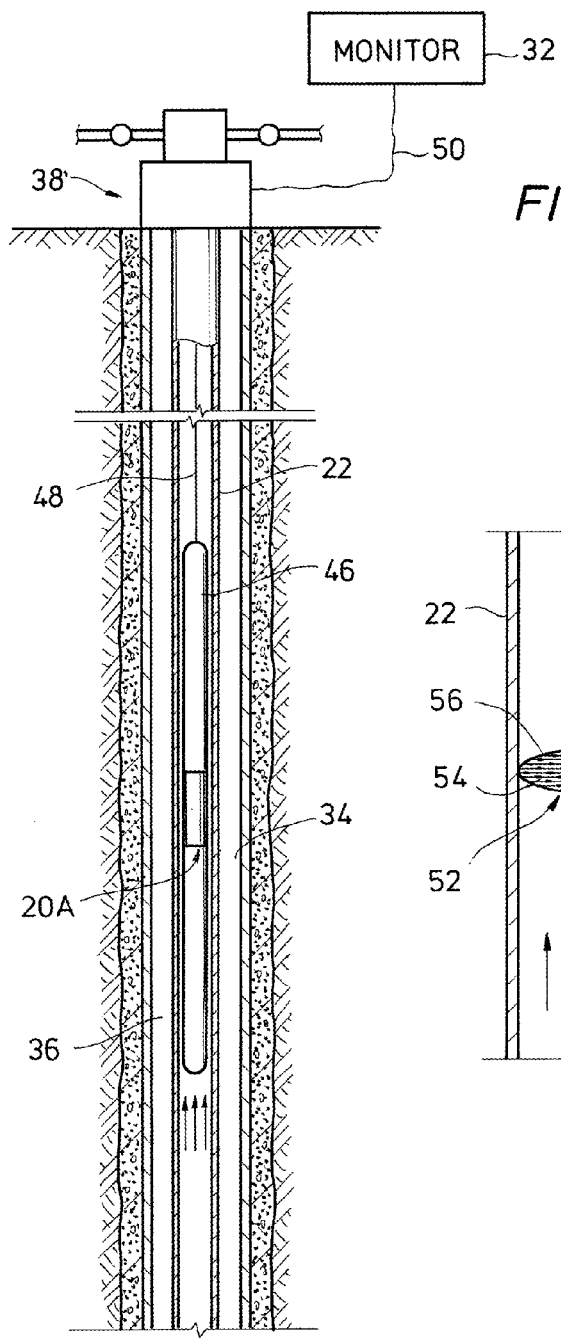
FIG. 7 is a side partial sectional view of an embodiment of the flowmeter of FIG. 1 disposed in a downhole tool.

Referring now to FIG. 7, a side partial sectional view is shown of an example where the flowmeter assembly 20A is disposed within an elongated downhole tool or sonde 46. In this example, the sonde 46 is inserted within production tubing 22 and into a fluid flow as shown by the arrows. An entrance (not shown) formed through a housing of sonde 46 enables the fluid flow to enter into the sonde 46 and make its way through the flowmeter assembly 20A. A conveyance means 48, which can be a wireline, slick line, or coiled tubing, can be used to deploy the sonde 46 and flowmeter assembly 20A within the tubing 22. Communication from the flowmeter assembly 20A can be provided to surface through the conveyance means 48 and up into the wellhead assembly 38. The conveyance means 48 couples with a wire 50 inside the wellhead assembly 38 that then extends from the wellhead assembly 38 into the monitor 32 for relaying signals to and from the flowmeter assembly 20A and also enables control signals to be directed back into the wellbore 34 from the surface.

Figure 8:
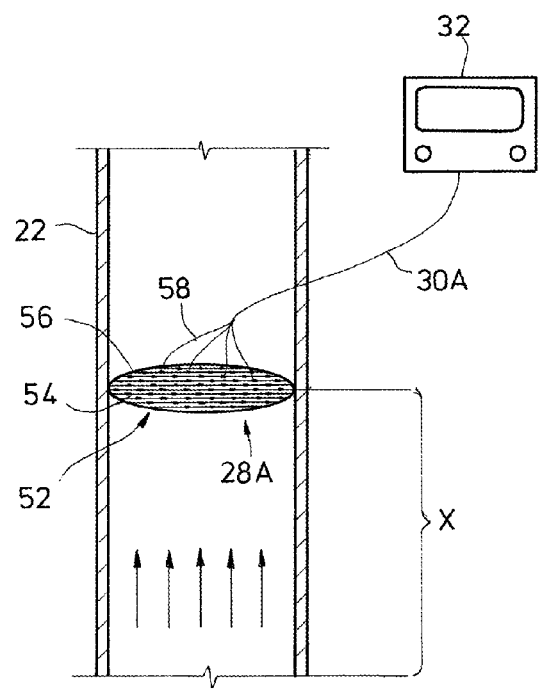
FIG. 8 is a side partial sectional view of an alternate embodiment of a temperature probe for use with a flowmeter in accordance with the present invention.

For contact temperature measurement, an alternate embodiment of a probe 28A is illustrated in FIG. 8 that includes an array 52 of probes. The array 52 of FIG. 8 includes thermocouples 54 suspended in the flow stream disposed strategically throughout the cross section of the tubular 22. Providing multiple thermocouples 54 as shown allows measuring a temperature distribution throughout the cross sectional area of the tubular 22. A matrix 56 of thin elongate members provides a mounting surface for the thermocouples 54. Leads 58 between the thermocouples 54 and line 30A provide discrete communication to individual thermocouples 54 so the location in the tubular 22 where a signal is recorded can be correlated with the value of the signal. To improve thermal contact with the corresponding phase, selective thermocouples 54, such as every other thermocouple 54, could be coated with either an oil wet or water wet coating. Alternatively, probe 28 could be a non-contact sensor such as a pyroelectric detector.

In one example, the electromagnetic wave(s) is made up of an infrared wave and having a wave length of about 1,450 nanometers. Optionally, the wave length of the electromagnetic wave can be about 1,930 nanometers. When in this range, the electromagnetic wave is useful for heating water within the fluid stream. In situations when it is desired to heat oil within the stream, an infrared wave having a wave length of about 1,740 nanometers can be used. Optionally, microwaves can be used that in one example embodiment have frequencies that are about 15 MHz, and in another embodiment have a frequency of around 5 MHz. In this example, the heated fluid would be oil. For a microwave useful for heating water, the microwave has a frequency of about 18 GHz.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

What is claimed is:

1. A method of measuring flow of a component of a wellbore fluid stream comprising:
   a. heating the component by irradiating the fluid stream with an electromagnetic wave having a wavelength that is absorbed by the component;
   b. sensing a temperature of the fluid stream downstream of where the fluid stream is being irradiated;
   c. detecting when the temperature of the fluid stream downstream of where the fluid stream is being irradiated increases due to heating with the electromagnetic wave; and
   d. estimating a velocity of the component based on a distance between where the fluid stream is being irradiated and where the temperature of the fluid stream is being sensed and a time of heating of step (a) and a time of detecting of step (c).

2. The method of claim 1, wherein the step of sensing temperature comprises sensing temperature at a plurality of discrete locations throughout a cross section of the fluid stream.

3. The method of claim 1, wherein the component comprises a first component and the fluid comprises a second component, the method further comprises heating the second component by irradiating the fluid stream with an electromagnetic wave having a wavelength that is absorbed by the second component and repeating steps (b) and (c), and estimating a velocity of the second component based on a distance between where the fluid stream is being irradiated and where the temperature of the fluid stream is being sensed and a time of heating and a time of detecting of step (c).

4. The method of claim 3, wherein the first component comprises hydrocarbon.

5. The method of claim 4, wherein the wavelength of the electromagnetic wave is about 1740 nanometers.

6. The method of claim 4, wherein the frequency of the electromagnetic wave has a value selected from the group consisting of about 15 MHz and about 5 MHz.

7. The method of claim 3, wherein the first component comprises water.

8. The method of claim 7, wherein the wavelength of the electromagnetic wave is about 1450 nanometers.

9. The method of claim 7, wherein the wavelength of the electromagnetic wave is about 1930 nanometers.

10. The method of claim 7, wherein the frequency of the electromagnetic wave is about 18 GHz.

11. A method of measuring a flow of a wellbore fluid comprising:
   a. heating oil in the flow of wellbore fluid by directing infrared radiation into the flow;
   b. detecting a temperature change in the fluid downstream of where the infrared radiation is directed into the flow that is caused by the infrared radiation heating the oil;
   c. estimating a velocity of the oil in the flow that is based on a time difference between when the oil is heated by the infrared radiation and when the temperature change in the fluid is sensed that is caused by the infrared radiation heating the oil;
   d. heating water in the flow of wellbore fluid by directing infrared radiation into the flow;
   e. detecting a temperature change in the fluid downstream of where the infrared radiation is directed into the flow that is caused by the infrared radiation heating the water; and
   f. estimating a velocity of the water in the flow that is based on a time difference between when the water is heated by the infrared radiation and when the temperature change in the fluid is sensed that is caused by the infrared radiation heating the water.

12. The method of claim 11, wherein the infrared radiation of step (a) has a wavelength of around 1740 nanometers.

13. The method of claim 11, wherein the infrared radiation of step (d) has a wavelength with a value selected from the group consisting of about 1450 nanometers and about 1930 nanometers.

14. A method of evaluating a flow of one or more fluid components flowing in a stream of a wellbore fluid, the method comprising:
   a. directing into the stream of wellbore fluid a microwave having a frequency that is absorbed by the fluid component thereby heating the fluid component;
   b. monitoring a temperature of the stream of wellbore fluid at a location downstream of where the microwave is directed into the stream;
   c. detecting a change in temperature of the stream of wellbore fluid downstream of where the microwave is directed into the stream that is caused by directing the microwave into the stream of wellbore fluid; and
   d. estimating a velocity of the component based on a time difference between when the microwave is directed into the stream and when the change in temperature is detected, and a distance difference between where the microwave is directed into the stream and where the change in temperature is detected.

15. The method of claim 14, further comprising estimating a volumetric flow rate of the component based on an amplitude of the change in temperature.

16. The method of claim 14, wherein the component comprises oil.

17. The method claim 16, wherein the frequency of the microwave is a value selected from the group consisting of about 5 MHz and about 15 MHz.

18. The method of claim 14, wherein the component comprises water.

19. The method of claim 18, wherein the frequency of the microwave is about 18 GHz.

20. The method of claim 19, wherein the component comprises oil, the method further comprising repeating steps (a)-(d) wherein the component comprises water, and wherein the step of monitoring temperature comprises an oil wet temperature probe and a water wet temperature probe, so that the oil and water components can be heated at substantially the same time and the heating of the oil and water components can be detected at substantially the same time.

* * * * *